UNITED STATES PATENT OFFICE.

BERNHARD HEYMANN, OF ELBERFELD, GERMANY, ASSIGNOR TO THE FARBENFABRIKEN OF ELBERFELD COMPANY, OF NEW YORK.

PROCESS OF MAKING INDIGO.

SPECIFICATION forming part of Letters Patent No. 626,231, dated June 6, 1899.

Application filed July 30, 1898. Serial No. 687,264. (No specimens.)

*To all whom it may concern:*

Be it known that I, BERNHARD HEYMANN, doctor of philosophy, chemist, (assignor to the FARBENFABRIKEN OF ELBERFELD COMPANY, of New York,) residing at Elberfeld, Germany, have invented a new and useful Improvement in the Production of Indigo; and I hereby declare the following to be a clear and exact description of my invention.

In United States Patent No. 618,096, dated January 24, 1899, I have described the production of a new diacetyl derivative of indoxyl which has probably the formula:

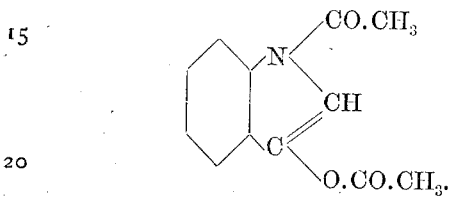

My present invention relates to the transformation of the said indoxyl compound into indigo; and it consists in general in, first, treating the diacetyl-indoxyl with saponifying agents in order to split off the acetyl groups, and, secondly, transforming the free indoxyl thus obtained with suitable oxidizing agents, such as the oxygen of the air, into indigo.

In carrying out my new process practically I can proceed as follows, (without limiting myself to the particulars given:) One kilo, by weight, of diacetyl-indoxyl is stirred into sixteen liters of a five-per-cent. caustic-soda lye, and the resulting mixture is heated with continuous stirring at about 100° centigrade until the whole diacetyl-indoxyl has dissolved. Subsequently a current of air is introduced into the liquid until the quantity of indigo, which begins to separate immediately, no longer increases. If this stage is reached, the indigo is filtered off, washed with water, and dried. The dyestuff is thus obtained in a very pure state.

Having now described my invention and in what manner the same is to be performed, what I claim as new, and desire to secure by Letters Patent, is—

The process for the production of indigo, which process consists in first saponifying diacetyl-indoxyl, having probably the formula

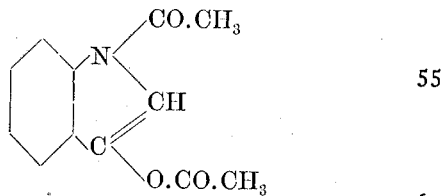

with caustic alkaline lyes, secondly oxidizing the saponified product, for which purpose the oxygen contained in the air may be used, finally separating the indigo so produced from the reaction mixture by filtration, substantially as described.

In testimony whereof I have signed my name in the presence of two subscribing witnesses.

BERNHARD HEYMANN.

Witnesses:
R. E. JAHN,
OTTO KÖNIG.